United States Patent
Zheng et al.

[19]

[11] Patent Number: 6,122,410
[45] Date of Patent: Sep. 19, 2000

[54] METHOD AND APPARATUS FOR LOCATING A TWO-DIMENSIONAL SYMBOL USING A DOUBLE TEMPLATE

[75] Inventors: Joe Zheng, Brookfield, Conn.; Jiansu Lai, Boston, Mass.

[73] Assignee: United Parcel Service of America, Inc., Atlanta, Ga.

[21] Appl. No.: 08/367,683

[22] Filed: Dec. 30, 1994

Related U.S. Application Data

[63] Continuation of application No. 08/024,386, Mar. 1, 1993, abandoned.

[51] Int. Cl.$^7$ .................................................. G06K 9/36
[52] U.S. Cl. ......................... 382/291; 382/209; 382/294
[58] Field of Search ................................... 382/317, 306, 382/291, 209; 235/494; 356/392, 393

[56] References Cited

U.S. PATENT DOCUMENTS

| | | | |
|---|---|---|---|
| 4,330,775 | 5/1982 | Iwamoto | 382/31 |
| 4,330,833 | 5/1982 | Pratt et al. | 364/515 |
| 4,547,800 | 10/1985 | Masaki | 358/107 |
| 4,736,109 | 4/1988 | Dvorzsak | 250/566 |
| 4,747,069 | 5/1988 | Grinberg et al. | 364/807 |
| 4,776,464 | 10/1988 | Miller et al. | 209/3.3 |
| 4,858,026 | 8/1989 | Richards | 358/310 |
| 4,874,936 | 10/1989 | Chandler et al. | 235/494 |
| 4,891,750 | 1/1990 | Pastor et al. | 382/21 |
| 4,896,029 | 1/1990 | Chandler et al. | 235/494 |
| 4,924,078 | 5/1990 | Sant'Anselmo et al. | 234/494 |
| 4,925,274 | 5/1990 | James et al. | 350/320 |
| 4,939,354 | 7/1990 | Priddy et al. | 235/456 |
| 4,949,392 | 8/1990 | Barski et al. | 382/61 |
| 4,992,650 | 2/1991 | Somerville | 235/462 |
| 5,042,074 | 8/1991 | Takeo et al. | 382/9 |
| 5,053,609 | 10/1991 | Priddy et al. | 235/436 |
| 5,063,602 | 11/1991 | Peppers et al. | 382/32 |
| 5,073,961 | 12/1991 | Takeo | 382/27 |
| 5,077,809 | 12/1991 | Ghazizadeh | 382/33 |
| 5,086,478 | 2/1992 | Kelly-Mahaffy et al. | 382/8 |
| 5,133,026 | 7/1992 | Fujiwara | 382/46 |
| 5,237,622 | 8/1993 | Howell | 382/8 |
| 5,263,098 | 11/1993 | Horikami | 382/33 |

FOREIGN PATENT DOCUMENTS

0356727A3 of 0000 European Pat. Off. .

*Primary Examiner*—Yon J. Couso
*Attorney, Agent, or Firm*—Morrison & Foerster LLP

[57] ABSTRACT

In a method and apparatus for locating the acquisition target of a two-dimensional symbol in a pixel image, the image is convolved with a double template. The position with the greatest correlation coefficient between the double template and the image is selected as the location of the acquisition target. The double template comprises two identical parallel one-dimensional single templates corresponding to two lines that cross the symmetrical acquisition target at equal distances from the center of the acquisition target. Using a double template instead of only a single template reduces the possibility of finding false positive locations of the acquisition target. Since the double template comprises two identical halves, the image is preferably convolved with only one half of the double template and the double-template correlation coefficients are then generated from these intermediate single-template correlation results. In a preferred embodiment, a binary pixel image is run-length encoded prior to being convolved with a run-length-encoded template.

44 Claims, 5 Drawing Sheets

METHOD AND APPARATUS FOR LOCATING A TWO-DIMENSIONAL SYMBOL USING A DOUBLE TEMPLATE

This is a continuation of copending application Ser. No. 08/024,386 filed on Mar. 1, 1993 now abandoned.

BACKGROUND OF THE INVENTION

1. Field of the Invention

The present invention relates to reading two-dimensional symbologies, and, in particular, to a method and apparatus for locating two-dimensional symbols in pixel images.

2. Statement of Related Art

U.S. Pat. Nos. 4,874,936 (Chandler et al.) and 4,896,029 (Chandler et al.) disclose articles, processes, and systems for polygonal information encoding, whereby information is encoded in a two-dimensional symbol comprising a plurality of polygons and an acquisition target. The purpose of an acquisition target is to have a known and easily recognized pattern which provides finding information for locating the symbol in the field of view of a sensing device.

One acquisition target disclosed in the '936 and '029 patents is of a geometric shape having optical properties capable of generating an easily recognizable video signal when scanned with an optical sensor across a linear scan line passing through the geometric center of the acquisition target. For example, the acquisition target may be a plurality of concentric rings of contrasting reflectivity (e.g., the bull's-eye pattern of FIG. 3), which will yield a periodic video signal when scanned linearly through its center.

The '936 and '029 patents disclose analog and digital methods for locating an acquisition target comprising a plurality of concentric rings. According to these methods, encoded labels are passed through a predetermined illuminated area and optically scanned by means of an electronically operated optical sensor. Alternatively, a hand-held optical scanner may be passed over the labels. In either case, the optical sensor produces an output which is an analog electrical signal corresponding to the intensities of the individual reflective properties of each area of a label, as recorded by the individual pixels of the optical sensor.

According to an analog method for locating the acquisition target, the analog signal generated by the optical sensor is filtered using an analog bandpass filter. The filter output is then compared to a signal corresponding to a line passing through the center of an ideal acquisition target. The center of the acquisition target is located when the output of the analog bandpass filter most closely approximates the ideal acquisition target signal. The analog signal is simultaneously digitized on a continuous basis by means of an analog-to-digital converter and stored in an image buffer. After locating the acquisition target, the stored digitized data representing the entire label is available for further decode processing.

According to a digital method for locating the acquisition target, the stored digital data representing the entire label is first filtered using a one-dimensional digital bandpass filter corresponding to a line through the center of an ideal acquisition target. This one-dimensional digital filter is used to find the coarse location of the acquisition target. After the coarse location is found, one or two two-dimensional digital filters may be used to find the fine location of the acquisition target.

Both the analog and digital methods disclosed in the '936 and '029 patents require the ideal acquisition target be of the same size as the imaged acquisition target. The location of the imaged acquisition target is determined by finding the region in the image that most closely matches the ideal acquisition target.

The two-dimensional filters are more accurate than the one-dimensional filter, but are slower because they require more computations. The one-dimensional filter is faster, but is less accurate and can result in false positive locations of the acquisition target. That is, the one-dimensional filter may falsely indicate that a particular location in the pixel image corresponds to the acquisition target, when it does not. This may occur where the size of the data-encoding elements (e.g., hexagons) in the two-dimensional symbol is of the same order of magnitude as the thickness of the concentric rings of the acquisition target. The two-dimensional filters are used after the coarse one-dimensional filter for two purposes: (1) to reject the false positive locations from the one-dimensional filter and (2) to find the fine location of the acquisition target for true positive locations.

SUMMARY OF THE INVENTION

According to a preferred embodiment, the present invention is a method and apparatus for locating an imaged acquisition target in a pixel image. According to this preferred embodiment, the image is convolved with a double template corresponding to an ideal acquisition target and the imaged acquisition target is located in the image in accordance with that convolution.

DETAILED DESCRIPTION OF THE INVENTION

The present invention relates to a method and apparatus for locating the imaged acquisition target of a two-dimensional symbol in a pixel image, such as those symbols disclosed in U.S. Pat. Nos. 4,874,936 (Chandler et al.) and 4,896,029 (Chandler et al.). The disclosures of the '936 and '029 patents are incorporated herein in their entireties by reference. According to a preferred embodiment, a representation of the pixel image is convolved with a double template that represents an ideal acquisition target. The results of that convolution are then analyzed to locate the imaged acquisition target in the pixel image. A preferred embodiment of the present invention may be used to locate imaged acquisition target of varying size with a single double template.

Figure 1:
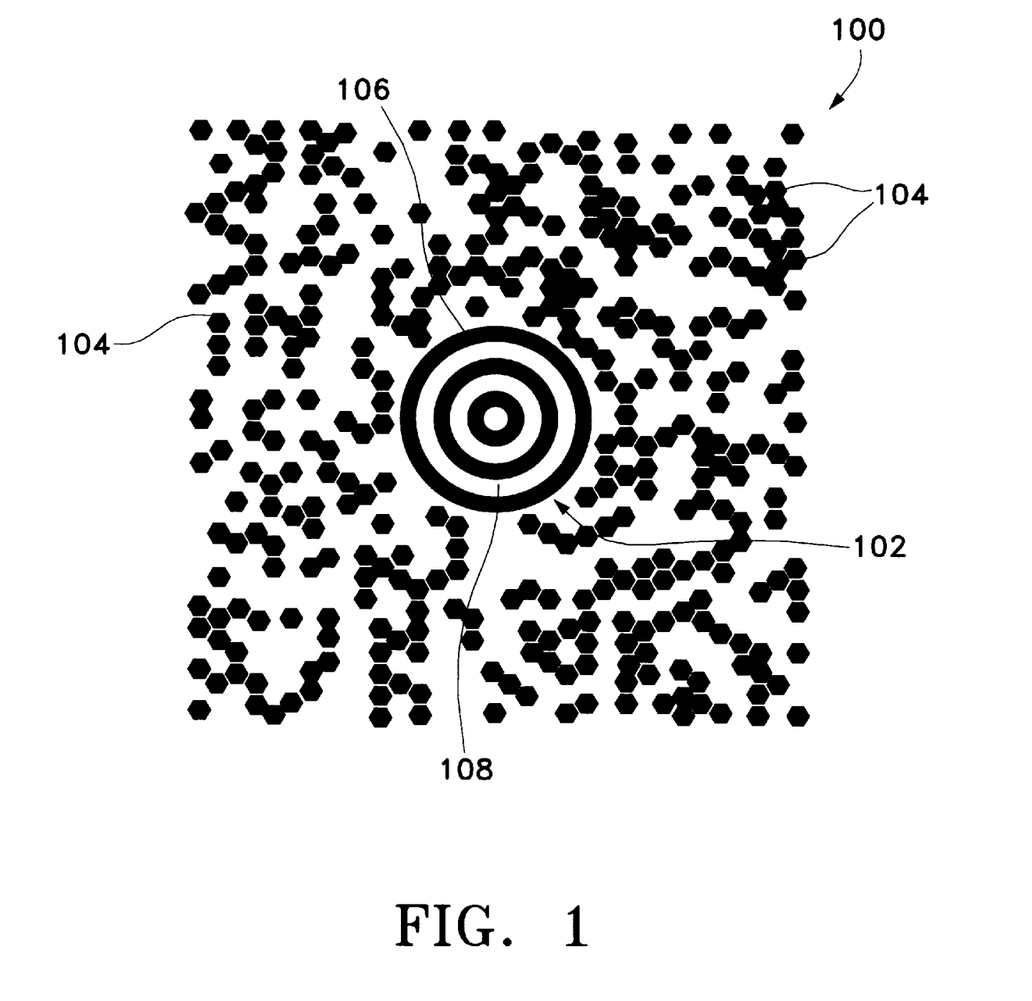
FIG. 1 is a two-dimensional symbol having an acquisition target as disclosed in the '936 and '029 patents.

Referring now to FIG. 1, there is shown a two-dimensional symbol 100 as disclosed in the '936 and '029 patents. Symbol 100, which may be located on a label background (not shown), comprises an acquisition target 102 and an array of hexagons 104. Alpha-numeric information is encoded in symbol 100 in the relative shading of hexagons 104 as either white or black. Acquisition target 102, which is preferably located at the center of symbol 100, comprises a bull's-eye pattern of three black rings 106 and three white rings 108, where the center white circle is one of the three white rings 108.

As described more fully in the '936 and '029 patents, a preferred process for reading a label having symbol 100 comprises the steps of illuminating the label, optically sensing the reflected image, processing the reflected image, and decoding symbol 100. The processing of the reflected image preferably comprises the step of locating acquisition target 102 in the image. Since acquisition target 102 is preferably located at the center of symbol 100, the step of locating acquisition target 102 also locates the center of symbol 100. After the center of symbol 100 is located, the image may be further processed as described in the '936 and '029 patents to decode symbol 100.

Figure 5:
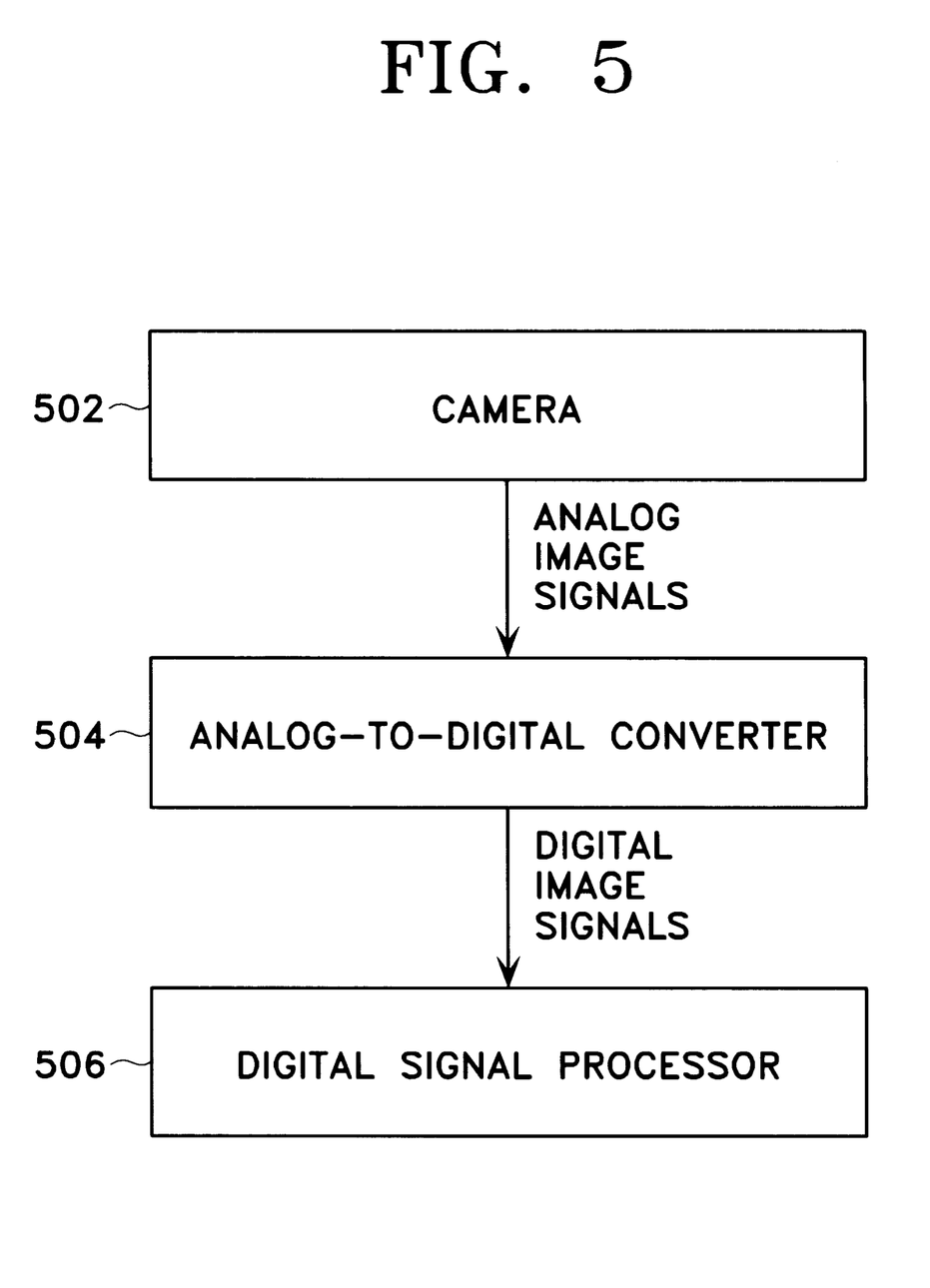
FIG. 5 is a block diagram of the system of FIG. 4.

In a preferred embodiment of the present invention, the image containing symbol 100 is a two-dimensional pixel image generated by scanning the label with a CCD-based (i.e., charge coupled device) linear-array camera, such as a Pulnix 7-CN black/white CCD camera manufactured by Pulnix America, Inc. of Sunnyvale, Calif. 94086. As shown in FIG. 5, the image signals are generated using camera 502 and analog-to-digital converter 504.

Figure 2:
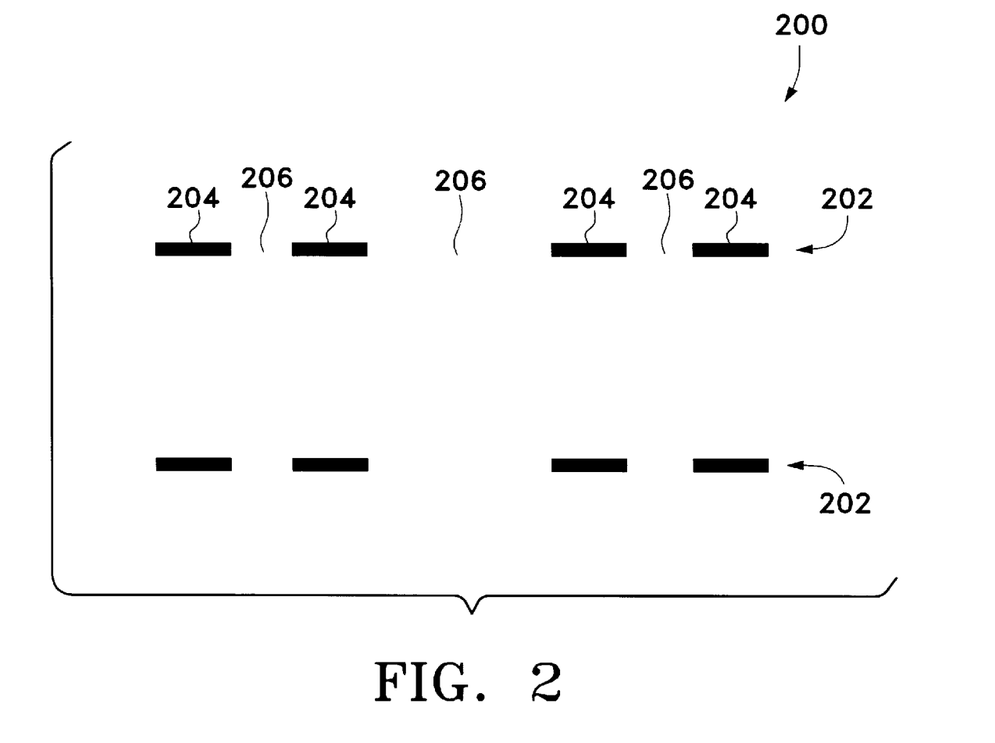
FIG. 2 is a double template used to locate the acquisition target of FIG. 1, according to a preferred embodiment of the present invention.

Referring now to FIG. 2, there is shown a double template 200 used to locate acquisition target 102 of FIG. 1, according to a preferred embodiment of the present invention. Double template 200 comprises two identical parallel one-dimensional single templates 202. Each single template 202 is a sequence of pixels that comprises four black pixel segments 204 separated by three white pixel segments 206, in which the pixel segments are of varying length. For example, single template 202 may comprise the 30-pixel sequence:

(BBBWWWBBBBWWWWWWWWWBBBBWW-WBBB), where "B" corresponds to a black pixel and "W" corresponds to a white pixel. The two single templates 202 of double template 200 correspond to two parallel lines crossing the acquisition target 102 at equal distances from the target center.

Figure 3:
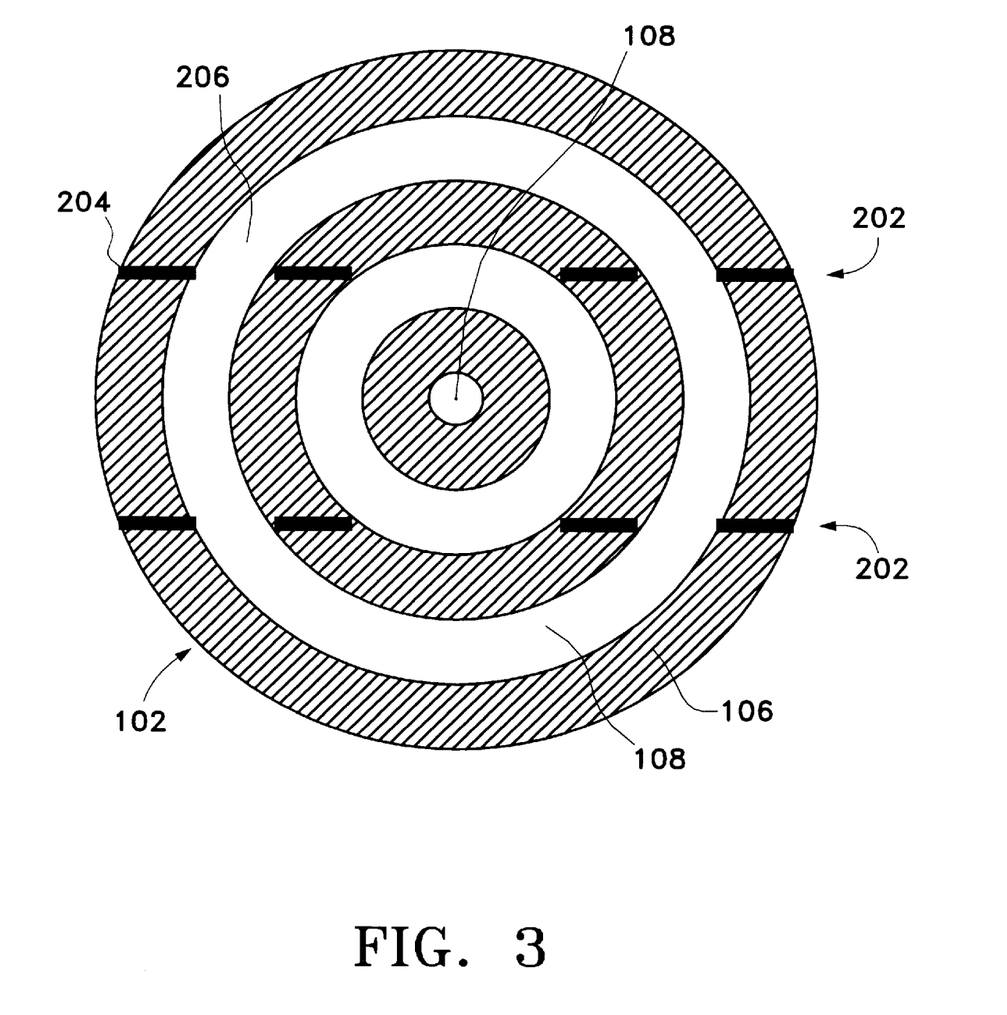
FIG. 3 shows the double template of FIG. 2 superimposed over the center of the acquisition target of FIG. 1.

Referring now to FIG. 3, there is shown double template 200 superimposed over the center of acquisition target 102. When double template 200 is positioned over the center of acquisition target 102, black segments 204 of double template 200 coincide with black rings 106 of acquisition target 102 and white segments 206 coincide with white rings 108. Those skilled in the art will understand that the correlation between double template 200 and acquisition target 102 is maximized when double template 200 is positioned over the center of acquisition target 102, as depicted in FIG. 3.

Acquisition target 102 is located by convolving double template 200 over the pixel image, calculating a correlation coefficient at each position in the convolution process, and selecting the position with the highest correlation coefficient as corresponding to the center of the acquisition target. Since the two single templates 202 of double template 200 are identical to one another, the pixel image is preferably convolved with only one single template 202 to generate a set of single-template correlation coefficients. The double-template correlation coefficients for the different positions of double template 200 are then generated by summing the appropriate two single-template correlation coefficients that correspond to each position of double template 200.

Using double template 200 rather than a single template 202 reduces the possibility of finding a false positive location of acquisition target 102. This is because the chances of finding a high correlation between double template 200 and a region of the pixel image that does not correspond to acquisition target 102 is typically less than the chances of finding a high correlation between single template 202 and such a region of the pixel image.

Those skilled in the art will also understand that double templates other than double template 200 may be used to locate acquisition target 102. The composition of a double template (i.e., the sequence of black and white segments in each single template that forms half of the double template) is a function of the distance from the center of the acquisition target to each single template. Similarly, it will be understood by those skilled in the art that the number of pixels in each black and white segment is a function of the pixel resolution of the imaged acquisition target to be located.

Figure 4:
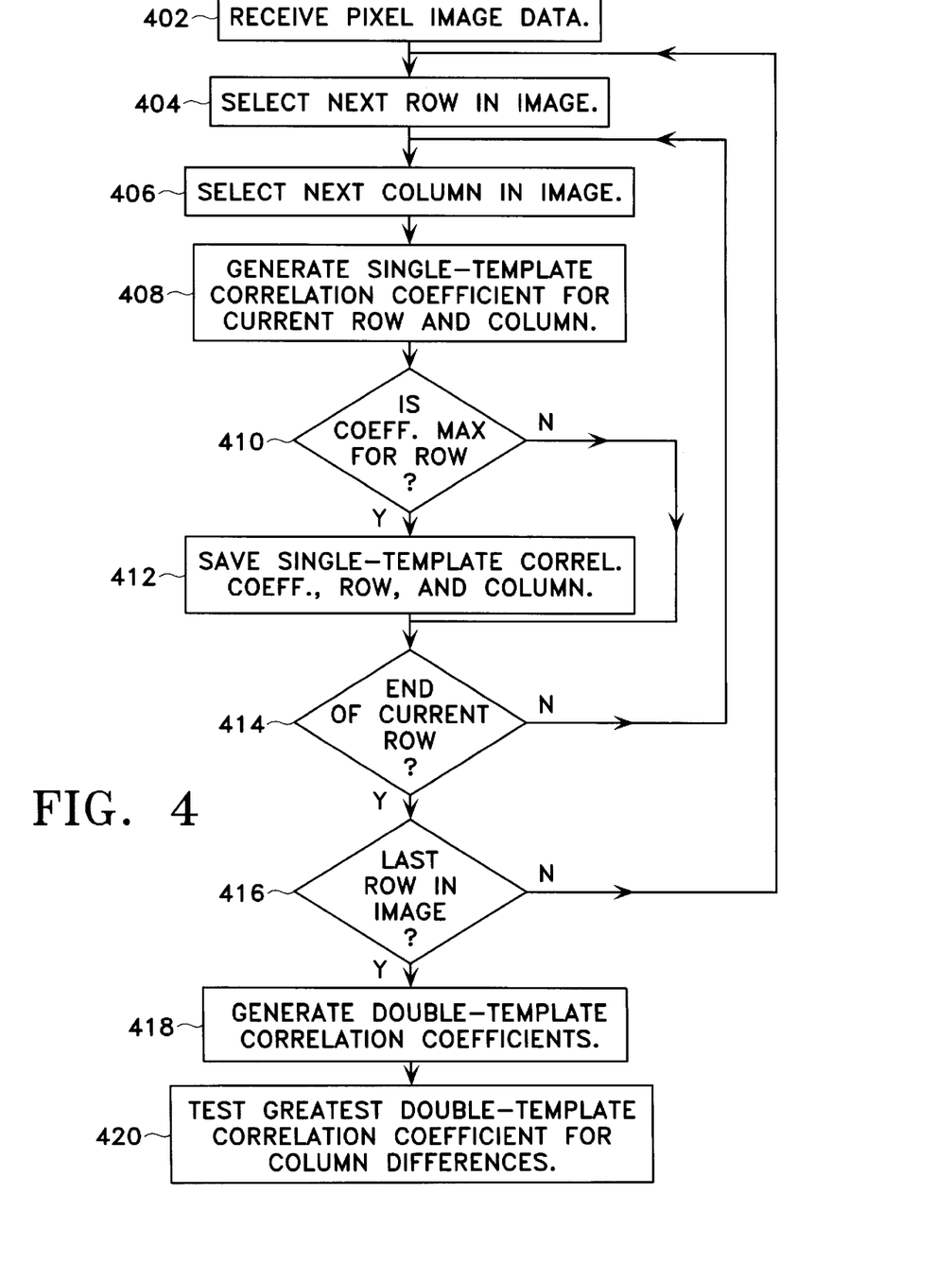
FIG. 4 is a process flow diagram of a system for locating the acquisition target of FIG. 1 using the double template of FIG. 3, according to a preferred embodiment of the present invention.

Referring now the FIG. 4, there is shown a process flow diagram of a system for locating acquisition target 102 using double template 200, according to a preferred embodiment of the present invention. The process begins with means 402 receiving the digital data corresponding to a pixel image of symbol 100.

Means 404 and 406 control the convolution of single template 202 (i.e., half of double template 200) through the pixel image by selecting a sequence of (row, column) positions in the pixel image. Means 404 sequentially selects the rows of the pixel image and means 406 sequentially selects the columns of each row. At each convolution position, single template 202 coincides with a portion of a row (or, alternatively, a column) of the pixel image. For example, for an image having 128 rows with 64 pixels per row and a 30-pixel single template 202, there will be 128×(64−30+1) or 4480 possible positions in the pixel image for which single template 202 coincides with a portion of a row of the pixel image without extending past the edge of the pixel image. Those skilled in the art will understand that, in this example, means 404 and 406 may sequentially select all 4480 positions or, if faster processing is desired, any subset of those 4480 positions.

Those skilled in the art will also recognize that, except for the regions near the top and bottom of the pixel image, each position in the pixel image corresponds to two different double-template positions—one position in which single template 202 forms the top half of double template 200 and another position in which single template 202 forms the bottom half of double template 200.

Continuing with the preceding example, assume that the distance between the two single templates 202 of double template 200 corresponds to ten rows in the pixel image. That is, when the top single template 202 of double template 200 coincides with a segment of row one of the pixel image, the bottom single template 202 of double template 200 coincides with a corresponding segment of row eleven of the pixel image. For this example then, there are (128−10+1)× (64−30+1) or 4165 possible positions for double template 200, where double template 200 does not extend past the top or bottom of the pixel image.

In this example, each position of single template 202 in rows 1 through 10 of the pixel image corresponds to the top half of a position for double template 200. Each position in rows 11 through 118 corresponds to two different positions for double templates 200—one corresponding to the top half of double template 200 at one position and the other corresponding to the bottom half of double template 200 at another position. Each position in rows 119 through 128 corresponds to the bottom half of a position for double template 200.

For each convolution position (i,j) (i.e., row i, column j), means 408 generates a single-template correlation coefficient ρ(i,j) using Equation (1) below:

$$\rho(i, j) = \frac{C_{ft}(i, j)}{\sqrt{\sigma_f(i, j)\sigma_t}}, \quad (1)$$

where $C_{ft}(i,j)$ is the cross-correlation or cross-variance between the segment of the row of the pixel image corresponding to position (i,j) and single template 202; $\sigma_f(i,j)$ is the auto-correlation or auto-variance of that segment of the pixel image; and $\sigma_t$ is the auto-correlation or auto-variance of single template 202. $C_{ft}(i,j)$, $\sigma_f(i,j)$, and $\sigma_t$ are determined in accordance with Equations (2)–(4) below:

$$C_{ft}(i, j) = \sum_{x=0}^{M} [f(x+i, j) - \bar{f}(i, j)][t(x) - \bar{t}] \quad (2)$$

$$\sigma_f(i, j) = \sum_{x=0}^{M} [f(x+i, j) - \bar{f}(i, j)]^2 \quad (3)$$

$$\sigma_t = \sum_{x=0}^{M} [t(x) - \bar{t}]^2 \quad (4)$$

where f(x+i,j) is the pixel intensity value at position (x+i,j) of the pixel image; t(x) is the pixel intensity value at position (x) of single template 202; $\bar{f}(i,j)$ is the average pixel intensity value of the segment of the row of the pixel image corresponding to position (i,j); and $\bar{t}$ is the average pixel intensity value of single template 202. In a binary image in which white and black pixels are represented by "1" and "0," respectively, f(i,j) is "1" for a white pixel and f(i,j) is "0" for a black pixel. $\bar{f}(i,j)$ and $\bar{t}$ are determined in accordance with Equations (5) and (6) below:

$$\bar{f}(i, j) = \frac{1}{M}\sum_{x=0}^{M} f(x+i, j) \quad (5)$$

$$\bar{t} = \frac{1}{M}\sum_{x=0}^{M} t(x) \quad (6)$$

where M is the size of (i.e., number of pixels in) single template 202.

The correlation coefficient ρ(i,j) will have a value between −1 and 1, where 1 corresponds to a perfect match between single template 202 and the segment of the row of the pixel image corresponding to position (i,j). Therefore, the higher the correlation coefficient ρ(i,j), the better the match between single template 202 and that segment of the pixel image.

Depending on the current convolution position (i,j) in the pixel image, each single-template correlation coefficient ρ(i,j) generated by means 408 may correspond to the bottom of a first double-template position or the top of a second double-template position or both. When means 404 selects convolution positions in the pixel image from top to bottom, the single-template correlation coefficient for the top half of the first double-template position will have been computed previously. Similarly, the single-template correlation coefficient for the bottom half of the second double-template position will be computed later in the processing.

Means 410 determines whether the current single-template correlation coefficient is the maximum value (MAX) so far for the currently selected row of the pixel image. If not, then processing continues to means 414. Otherwise, means 412 saves the current single-template correlation coefficient as the new maximum value for the current row. Means 412 also saves the currently selected row and column as the position corresponding to that maximum correlation coefficient.

Means 414 determines whether the currently selected column is the last column to be selected for the current row. If not, then processing returns to means 406 to select the next column in the current row. Otherwise, processing continues to means 416. Means 416 determines whether the currently selected row is the last row of the pixel image. If not, then processing returns to means 404 to select the next row in the pixel image. Otherwise, the convolution of single template 202 through the pixel image is complete and processing continues to means 418. When the convolution of single template 202 through the pixel image is complete, there is stored in memory one maximum single-template correlation coefficient and the corresponding (row, column) position for each row of the pixel image.

Means 418 generates a double-template correlation coefficient for each pair of rows of the image corresponding to a possible double template 200. For example, when the distance between the two single templates 202 of double template 200 corresponds to ten rows in the pixel image, means 418 adds the maximum single-template correlation coefficient from row 1 to the maximum single-template correlation coefficient from row 11 to yield the double-template correlation coefficient corresponding to row 1 of the pixel image similarly, the double-template correlation coefficient corresponding to row 2 of the pixel image is generated by means 418 by summing the maximum single-template correlation coefficients from rows 2 and 12. Note that the maximum single-template correlation coefficient from row 11 is also added by means 418 to the maximum single-template correlation coefficient from row 21 to yield the double-template correlation coefficient corresponding to row 11.

After means 418 generates all the possible double-template correlation coefficients, means 420 selects the double-template correlation coefficient with the greatest value. Means 420 then tests that greatest coefficient to make sure that the two single-template correlation coefficients that were summed to form that greatest coefficient correspond to approximately the same columns.

For example, assume that the double-template correlation coefficient corresponding to row 1 of the pixel image has the greatest value. Assume further that the single-template correlation coefficient from row 1 corresponds to column position j1 and that the single-template correlation coefficient from row 11 corresponds to column position j11. If j1 and j11 are within n pixels of one another, where n is a specified threshold value (e.g., n=4), then means 420 selects row 6 (the row midway between rows 1 and 11) and column (j1+j11)/2 (the column midway between columns j1 and j11) as the location of acquisition target 102.

Otherwise, the single-template correlation coefficients from rows 1 and 11 are too far apart (in the column direction) and therefore do not correspond to the same double template 200. In that situation, means 420 rejects the double-template correlation coefficient of row 1 as a false positive location of acquisition target 102. Means 420 proceeds to test the column difference for the next greatest double-template correlation coefficient until the column difference test is passed and a true positive location of acquisition target 102 is found.

Those skilled in the art will understand that subsequent processing may comprise the step of determining a more fine location of acquisition target 102 using two-dimensional templates as described more fully in the '936 and '029 patents.

In an alternative preferred embodiment of the present invention for locating an acquisition target in a binary pixel image, the binary pixel image is run-length encoded prior to being convolved with a single template. In run-length encoding, each sequence of consecutive white or black pixels in each row of the binary pixel image is represented by the number of pixels in that sequence. For example, the 30-pixel binary sequence:

(BBBWWWBBBBWWWWWWWWWWBBBBWW-WBBB), where "B" corresponds to a black pixel and "W" corresponds to a white pixel, may be run-length encoded into the 7-pixel gray-scale sequence:

(3,3,4,10,4,3,3).

The result of run-length encoding a binary pixel image is a corresponding gray-scale pixel "image" having as many rows as the binary image but with typically fewer columns. Moreover, the number of columns will typically vary from row to row.

According to this preferred embodiment of the present invention, the procedure for locating the acquisition target is analogous to the procedure described earlier in this specification in conjunction with FIG. 4, except that the run-length-encoded gray-scale pixel image is convolved with a run-length-encoded representation of single template 202. Referring again to FIG. 4, means 402 may perform the step of run-length-encoding the binary pixel image. The relationships of Equations (1) through (6) are then applied by treating the run-length-encoded image and run-length-encoded template as gray-scale pixel images.

In this preferred embodiment, the column position saved by means 412 is the column position in the original pixel image (prior to run-length encoding). This column position is determined by summing the gray-scale values for the pixels that precede the currently selected pixel along the currently selected row in the run-length encoded image. When run-length encoding is performed from left to right along each pixel row, the preceding pixels are those pixels to the left of the currently selected pixel.

Those skilled in the art will understand that using run-length encoding will typically reduce the computational requirements for locating an acquisition target in a binary pixel image and, therefore, make the process faster. It will also be understood by those skilled in the art that, by run-length-encoding and then calculating the correlation coefficient in the convolution process, the size of the single template need not be the same size as the imaged acquisition target to be located. Therefore, a single template representing an ideal acquisition target can be used to locate imaged acquisition targets of different sizes in pixel images.

Since, in this preferred embodiment, the sizes of the imaged acquisition target may vary, the number of rows separating the two single templates of a double template will also vary. The number of rows separating the two single templates of a double template may be determined by counting the number of black/white transitions between the mid-points of the single templates. For example, the double template depicted in FIG. 3 has four black/white transitions between the white mid-point of the upper single template and the white mid-point of the lower single template. Thus, for two single templates to be considered part of the same double template, there must be exactly four black/white transitions between the mid-points of the two single templates and those mid-points must be white.

Those skilled in the art will understand that the image may be convolved with a template that coincides with a portion of a column of the pixel image as opposed to coinciding with a portion of an image row. In another alternative preferred embodiment of the present invention, two analogous convolution procedures are performed—one based on image rows and the other based on image columns. The results from these two convolution procedures are then used to determine the location of the center of the acquisition target.

The present invention is preferably implemented in software in C language running on a digital signal processing (DSP) chip, such as a C-30 manufactured by Texas Instruments, Inc. of Houston, Texas. As shown in FIG. 5, digital signal processor 506 implements the processing of FIG. 4. The present invention may be used to locate acquisition targets in either binary or gray-scale pixel images.

Those skilled in the art will understand that the present invention may be implemented in systems other than those for reading two-dimensional symbologies. For example, the present invention may be implemented in a system that characterizes the quality of printers used to generate labels containing two-dimensional symbols. The present invention may also be implemented in a system that locates any symmetric acquisition target in an image, not just those associated with two-dimensional symbologies.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for locating the position of an imaged acquisition target in a pixel image, comprising the following steps:

(a) generating image signals corresponding to said image with a camera, said image comprising said imaged acquisition target;

(b) comparing said image signals with template signals corresponding to a double template at a plurality of positions within said image using a processor, said double template corresponding to an ideal acquisition target, wherein said double template comprises two identical halves; and (c) locating the position of said imaged acquisition target in said image using the processor in accordance with said comparisons of step (b).

2. The method of claim 1, further comprising the step of decoding a two-dimensional symbol corresponding to said located imaged acquisition target using the processor.

3. The method of claim 1, further comprising the step of characterizing the quality of at least a portion of said image using the processor.

4. The method of claim 1, wherein step (b) comprises the step of calculating a plurality of correlation coefficients between said double template and said image at said plurality of positions within said image using the processor, and step (c) comprises the step of locating said imaged acquisition target in said image in accordance with said plurality of correlation coefficients using the processor.

5. The method of claim 4, wherein step (c) comprises the step of selecting the position corresponding to the greatest correlation coefficient of said plurality of correlation coefficients as the location of said imaged acquisition target in said image using the processor.

6. The method of claim 1, wherein said ideal acquisition target comprises a series of concentric rings.

7. The method of claim 6, wherein said ideal acquisition target is associated with a two-dimensional symbol having a plurality of polygonal cells.

8. The method of claim 1, wherein said double template corresponds to two rows of said ideal acquisition target.

9. The method of claim 1, wherein said ideal acquisition target is symmetric about its center, and said double template comprises two identical single templates, wherein said two single templates correspond to two identical rows of said ideal acquisition target.

10. The method of claim 9, wherein step (b) comprises the steps of:
(1) calculating a plurality of single-template correlation coefficients between one of said two single templates and said image at a plurality of positions within said image using the processor; and
(2) calculating a plurality of double-template correlation coefficients in accordance with said plurality of single-template correlation coefficients using the processor;
and step (c) comprises the step of locating said imaged acquisition target in said image in accordance with said plurality of double-template correlation coefficients using the processor.

11. The method of claim 1, wherein step (b) comprises the steps of:
(1) run-length encoding said image to generate a run-length-encoded image using the processor; and
(2) comparing said run-length-encoded image with a run-length-encoded double template corresponding to said ideal acquisition target at a plurality of positions within said run-length-encoded image using the processor.

12. An apparatus for locating the position of an imaged acquisition target in a pixel image, comprising:
(a) a camera for generating image signals corresponding to said image, said image comprising said imaged acquisition target; and
(b) a processor for comparing said image signals with template signals corresponding to a double template at a plurality of positions within said image, said double template corresponding to an ideal acquisition target, wherein said double template comprises two identical halves; and for locating the position of said imaged acquisition target in said image in accordance with said comparisons.

13. The apparatus of claim 12, wherein the processor decodes a two-dimensional symbol corresponding to said located imaged acquisition target.

14. The apparatus of claim 12, wherein the processor characterizes the quality of at least a portion of said image.

15. The apparatus of claim 12, wherein the processor calculates a plurality of correlation coefficients between said double template and said image at said plurality of positions within said image, and the processor locates said imaged acquisition target in said image in accordance with said plurality of correlation coefficients.

16. The apparatus of claim 15, wherein the processor selects the position corresponding to the greatest correlation coefficient of said plurality of correlation coefficients as the location of said imaged acquisition target in said image.

17. The apparatus of claim 12, wherein said ideal acquisition target comprises a series of concentric rings.

18. The apparatus of claim 17, wherein said ideal acquisition target is associated with a two-dimensional symbol having a plurality of polygonal cells.

19. The apparatus of claim 12, wherein said double template corresponds to two rows of said ideal acquisition target.

20. The apparatus of claim 12, wherein said ideal acquisition target is symmetric about its center, and said double template comprises two identical single templates, wherein said two single templates correspond to two identical rows of said ideal acquisition target.

21. The apparatus of claim 20, wherein the processor:
(1) calculates a plurality of single-template correlation coefficients between one of said two single templates and said image at a plurality of positions within said image;
(2) calculates a plurality of double-template correlation coefficients in accordance with said plurality of single-template correlation coefficients; and
(3) locates said imaged acquisition target in said image in accordance with said plurality of double-template correlation coefficients.

22. The apparatus of claim 12, wherein the processor:
(1) run-length encodes said image to generate a run-length-encoded image; and
(2) compares said run-length-encoded image with a run-length-encoded double template corresponding to said ideal acquisition target at a plurality of positions within said run-length-encoded image.

23. A computer-implemented method for locating the position of an imaged acquisition target in a pixel image, comprising the following steps:
(a) generating image signals corresponding to said image with a camera, said image comprising said imaged acquisition target;
(b) comparing said image signals with template signals corresponding to a double template at a plurality of positions within said image using a processor, said double template corresponding to an ideal acquisition target, wherein at least one half of said double template does not correspond with a center of said ideal acquisition target; and
(c) locating the position of said imaged acquisition target in said image using the processor in accordance with said comparisons of step (b).

24. The method of claim 23, further comprising the step of decoding a two-dimensional symbol corresponding to said located imaged acquisition target using the processor.

25. The method of claim 23, further comprising the step of characterizing the quality of at least a portion of said image using the processor.

26. The method of claim 23, wherein step (b) comprises the step of calculating a plurality of correlation coefficients between said double template and said image at said plurality of positions within said image using the processor, and step (c) comprises the step of locating said imaged acquisition target in said image in accordance with said plurality of correlation coefficients using the processor.

27. The method of claim 26, wherein step (c) comprises the step of selecting the position corresponding to the greatest correlation coefficient of said plurality of correlation coefficients as the location of said imaged acquisition target in said image using the processor.

28. The method of claim 23, wherein said ideal acquisition target comprises a series of concentric rings.

29. The method of claim 28, wherein said ideal acquisition target is associated with a two-dimensional symbol having a plurality of polygonal cells.

30. The method of claim 23, wherein said double template corresponds to two rows of said ideal acquisition target.

31. The method of claim 23, wherein said ideal acquisition target is symmetric about its center, and said double template comprises two identical single templates, wherein said two single templates correspond to two identical rows of said ideal acquisition target.

32. The method of claim 31, wherein step (b) comprises the steps of:
(1) calculating a plurality of single-template correlation coefficients between one of said two single templates and said image at a plurality of positions within said image using the processor; and
(2) calculating a plurality of double-template correlation coefficients in accordance with said plurality of single-template correlation coefficients using the processor;
and step (c) comprises the step of locating said imaged acquisition target in said image in accordance with said plurality of double-template correlation coefficients using the processor.

33. The method of claim 23, wherein step (b) comprises the steps of:
(1) run-length encoding said image to generate a run-length-encoded image using the processor; and
(2) comparing said run-length-encoded image with a run-length-encoded double template corresponding to said ideal acquisition target at a plurality of positions within said run-length-encoded image using the processor.

34. An apparatus for locating the position of an imaged acquisition target in a pixel image, comprising:
(a) a camera for generating image signals corresponding to said image, said image comprising said imaged acquisition target; and
(b) a processor:
for comparing said image signals with template signals corresponding to a double template at a plurality of positions within said image, said double template corresponding to an ideal acquisition target, wherein at least one half of said double template does not correspond with a center of said ideal acquisition target; and
for locating the position of said imaged acquisition target in said image in accordance with said comparisons.

35. The apparatus of claim 34, wherein the processor decodes a two-dimensional symbol corresponding to said located imaged acquisition target.

36. The apparatus of claim 34, wherein the processor characterizes the quality of at least a portion of said image.

37. The apparatus of claim 34, wherein the processor calculates a plurality of correlation coefficients between said double template and said image at said plurality of positions within said image, and the processor locates said imaged acquisition target in said image in accordance with said plurality of correlation coefficients.

38. The apparatus of claim 37, wherein the processor selects the position corresponding to the greatest correlation coefficient of said plurality of correlation coefficients as the location of said imaged acquisition target in said image.

39. The apparatus of claim 34, wherein said ideal acquisition target comprises a series of concentric rings.

40. The apparatus of claim 39, wherein said ideal acquisition target is associated with a two-dimensional symbol having a plurality of polygonal cells.

41. The apparatus of claim 34, wherein said double template corresponds to two rows of said ideal acquisition target.

42. The apparatus of claim 34, wherein said ideal acquisition target is symmetric about its center, and said double template comprises two identical single templates, wherein said two single templates correspond to two identical rows of said ideal acquisition target.

43. The apparatus of claim 42, wherein the processor:
(1) calculates a plurality of single-template correlation coefficients between one of said two single templates and said image at a plurality of positions within said image;
(2) calculates a plurality of double-template correlation coefficients in accordance with said plurality of single-template correlation coefficients; and
(3) locates said imaged acquisition target in said image in accordance with said plurality of double-template correlation coefficients.

44. The apparatus of claim 34, wherein the processor:
(1) run-length encodes said image to generate a run-length-encoded image; and
(2) compares said run-length-encoded image with a run-length-encoded double template corresponding to said ideal acquisition target at a plurality of positions within said run-length-encoded image.

* * * * *